(12) United States Patent
Chang

(10) Patent No.: US 10,377,012 B2
(45) Date of Patent: Aug. 13, 2019

(54) METHOD FOR MANUFACTURING ANGLE-TYPE AIR TOOL HOUSING

(71) Applicant: SUPER MASTER DEVELOPING CO., LTD., Taipei (TW)

(72) Inventor: Chung-Ho Chang, Taipei (TW)

(73) Assignee: SUPER MASTER DEVELOPING CO., LTD., Taipei (TW)

(*) Notice: Subject to any disclaimer, the term of this patent is extended or adjusted under 35 U.S.C. 154(b) by 101 days.

(21) Appl. No.: 15/823,106

(22) Filed: Nov. 27, 2017

(65) Prior Publication Data

US 2019/0160624 A1    May 30, 2019

(51) Int. Cl.
| | |
|---|---|
| *B24B 23/02* | (2006.01) |
| *B25F 5/02* | (2006.01) |
| *B29C 45/26* | (2006.01) |
| *B29C 45/16* | (2006.01) |
| *B29C 41/20* | (2006.01) |
| *B29C 45/14* | (2006.01) |
| *B21D 47/01* | (2006.01) |
| *B29L 31/34* | (2006.01) |
| *B29K 105/00* | (2006.01) |

(52) U.S. Cl.
CPC ............ *B24B 23/028* (2013.01); *B21D 47/01* (2013.01); *B25F 5/02* (2013.01); *B29C 41/20* (2013.01); *B29C 45/14819* (2013.01); *B29C 45/1671* (2013.01); *B29C 45/2612* (2013.01); *B29C 45/14598* (2013.01); *B29K 2105/0067* (2013.01); *B29L 2031/3481* (2013.01); *F16D 2250/0007* (2013.01); *Y10T 29/4998* (2015.01); *Y10T 29/49982* (2015.01)

(58) Field of Classification Search
CPC ..... B24B 23/028; B25F 5/02; B29C 45/2612; B29C 45/1671; B29C 45/1459; B29C 45/14598; B29C 45/14819; B29C 41/30; B29C 41/20; B29C 45/14; Y10T 29/4998; Y10T 29/49882
See application file for complete search history.

(56) References Cited

U.S. PATENT DOCUMENTS

| | | | | |
|---|---|---|---|---|
| 2,561,351 | A * | 7/1951 | Wendell | F16L 33/245 264/257 |
| 4,172,583 | A * | 10/1979 | Wrasman | B29C 45/14754 251/172 |
| 2005/0048884 | A1* | 3/2005 | Baker | B23B 45/003 451/358 |

* cited by examiner

*Primary Examiner* — Jermie E Cozart
(74) *Attorney, Agent, or Firm* — Muncy, Geissler, Olds & Lowe, P.C.

(57) ABSTRACT

A method for manufacturing an angle-type air tool housing is provided. The angle-type air tool housing includes a hollow tube having a first end and a second end that are open and are mutually in communication, and an overall housing formed by injection molding and enveloping the hollow tube, and having an accommodating chamber adjacent to the first end, an air channel adjacent to the second end and in communication with the accommodating chamber through the hollow tube, and a pair of recesses exposing a part of the hollow tube. Accordingly, the angle-type air tool housing that is a formed integral with the hollow tube is formed so as to achieve effects of reduced costs and weight.

5 Claims, 8 Drawing Sheets

METHOD FOR MANUFACTURING ANGLE-TYPE AIR TOOL HOUSING

FIELD OF THE INVENTION

The present invention relates to a method for manufacturing an angle-type air tool housing, and particularly to a method for manufacturing an angle-type air tool housing as a formed integral through injection molding.

BACKGROUND OF THE INVENTION

A tool machine, particularly an air tool, drives and rotates a grinding assembly by an air pressure so as to grind an object.

In a conventional air tool machine, in order to allow an air pressure to pass through, an air channel allowing a gas to pass through is usually provided in advance on an angle-type air tool housing, so as to drive the grinding assembly.

As previously described, the air channel on the angle-type air tool machine is a curved channel instead of a linear channel, such that an associated manufacturing process suffers from various limitations.

A current angle-type air tool housing is primarily manufactured through casting, particularly through sand mold casting. When sand mold casting is adopted, a sand core is removed, and the air channel is then formed in the angle-type air tool housing.

However, the manufacturing method using casting is both high in cost and slow in production efficiency, and the angle-type air tool housing formed also has a heavy weight. For an operator that needs to hold the air tool machine for an extended period of time, such air tool machine is strenuous and may further cause occupational injuries over an extend period of use.

SUMMARY OF THE INVENTION

In view of the above, it is a primary object of the present invention to provide an angle-type air tool housing as a formed integral manufactured through injection molding.

According to the above object, the present invention provides method for manufacturing an angle-type air tool housing. The method includes: step (1), providing a hollow tube having a first end and a second end that are open and are mutually in communication; step (2), sealing the first end and the second end of the hollow tube, and placing the hollow tube in a mold having a formation space, wherein the mold includes therein a pair of clamping portions for clamping the hollow tube such that the hollow tube is positioned in the mold by using the pair of clamping portions; step (3), injecting a plastic material into the formation space of the mold to have the plastic mold fill the formation space and envelop the hollow tube, and curing the plastic material to form an overall housing according to the shape of the formation space; and step (4), removing the overall housing from the mold, wherein the overall housing includes an accommodating chamber and an air channel that are mutually spaced, the accommodating chamber is adjacent to the first end of the hollow tube, and the air channel is adjacent to the second end of the hollow tube; and unsealing the first end and the second end, such that the accommodating chamber and the air channel are mutually in communication through the hollow tube, wherein the overall housing is provided with a pair of recesses at positions corresponding to the pair of clamping portions, in a way that a part of the hollow tube is exposed at the pair of recesses, thus forming an angle-type air tool housing that is a formed integral with the hollow tube.

In one embodiment, the hollow tube is further made of one selected from a metal material and a non-metal material.

In one embodiment, the first end of the hollow tube is further sealed by a stopper, and the second end is further sealed by a thimble.

In one embodiment, the accommodating chamber further includes a first air chamber and a second air chamber mutually in communication, and the first end of the hollow tube is adjacent to the first air chamber.

In one embodiment, at least one air discharging groove in communication with the second air chamber is further formed on the overall housing, and is spaced from the air channel.

With the above technical solution, the present invention substantially and effectively achieves following effects compared to the prior art.

1. Compared to the prior art, the angle-type air tool housing of the present invention is a formed by injection molding using a plastic material outside a hollow tube, allowing the hollow tube to form an integral with the overall housing. Thus, the present invention can be used for mass production to enhance production efficiency.

2. The overall housing of the present invention is formed by a plastic material and has a lighter weight, and is thus capable of reducing a burden of an operator.

DETAILED DESCRIPTION OF THE PREFERRED EMBODIMENTS

Details and technical contents of the present invention are given with the accompanying drawings below.

Referring to FIG. 1, FIG. 2A, FIG. 2B, FIG. 2C, FIG. 2D, and FIG. 2E, it is clearly seen from the diagrams that, a method for manufacturing an angle-type air tool housing 10 provided by the present invention includes following steps.

Figure 1:
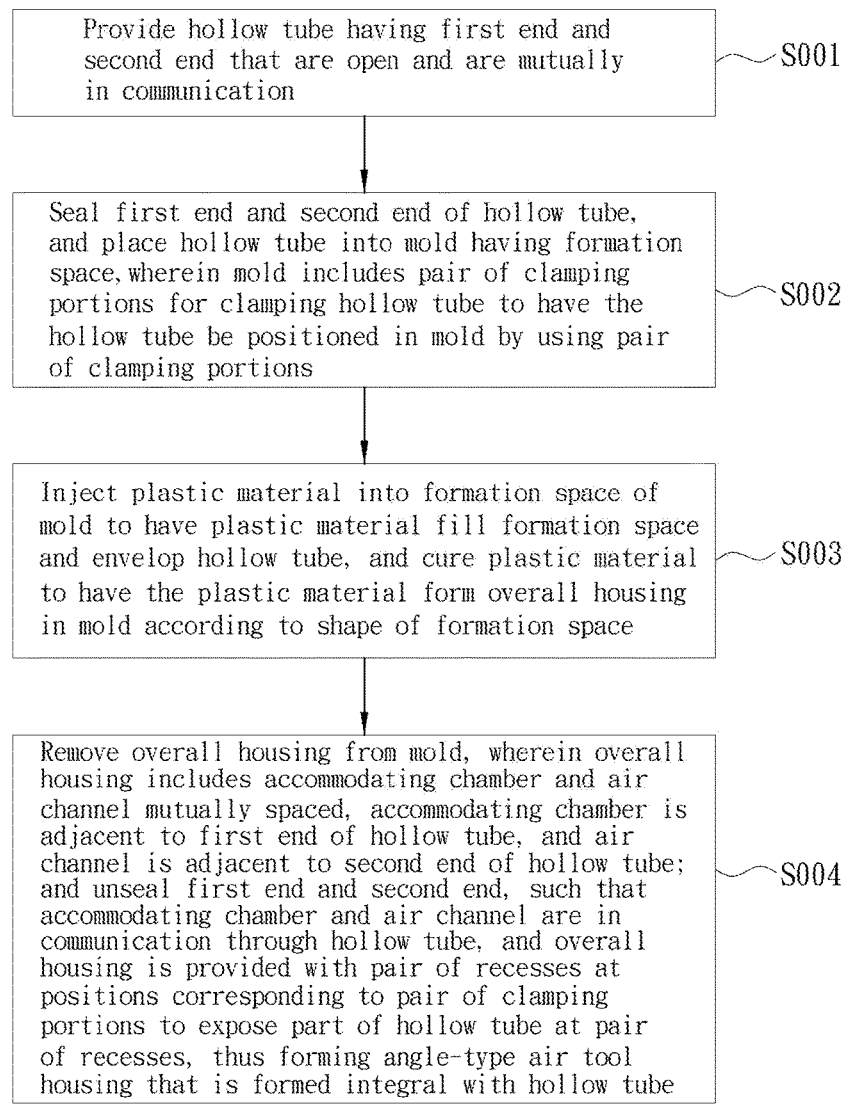
FIG. 1 is a flowchart including steps of the present invention.
Figure 2A:
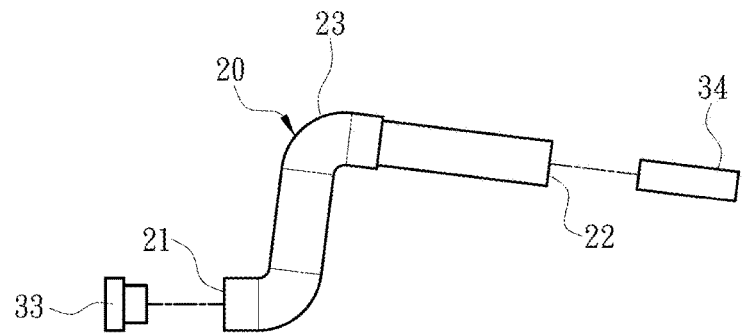
FIG. 2A to FIG. 2E are schematic diagrams of formation steps of the present invention.
Figure 2B:
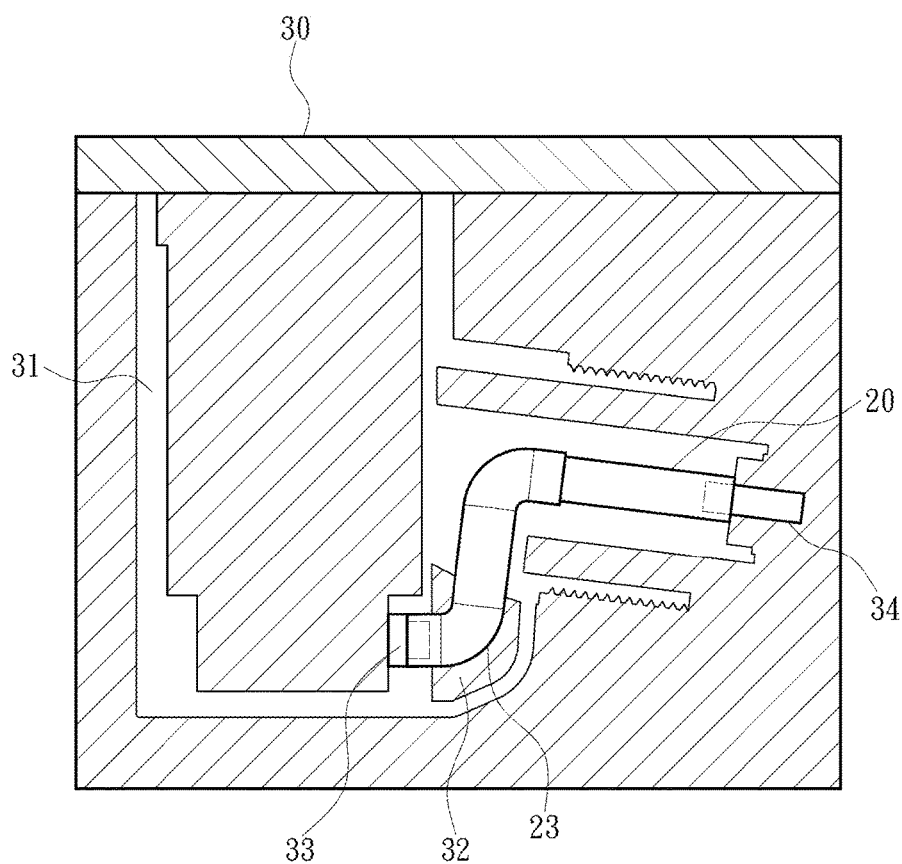
Figure 2C:
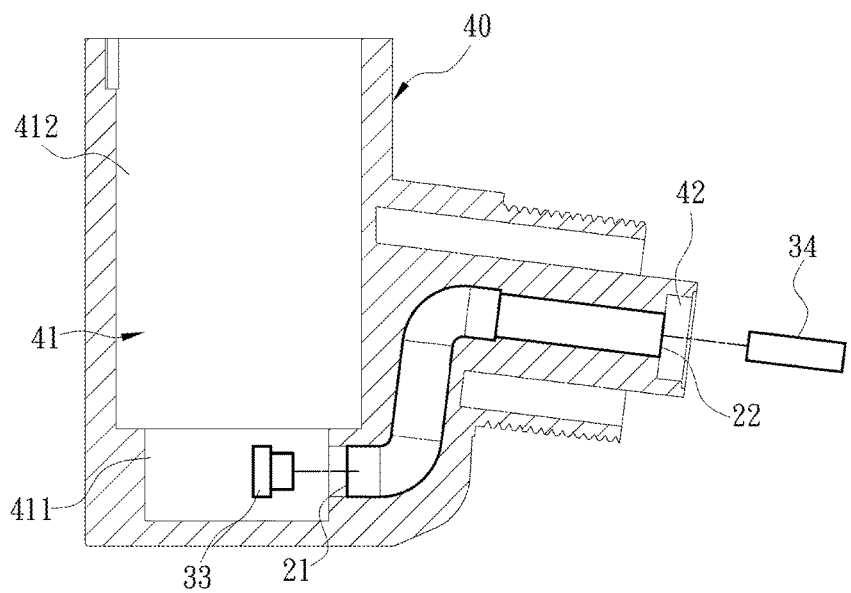
Figure 2D:
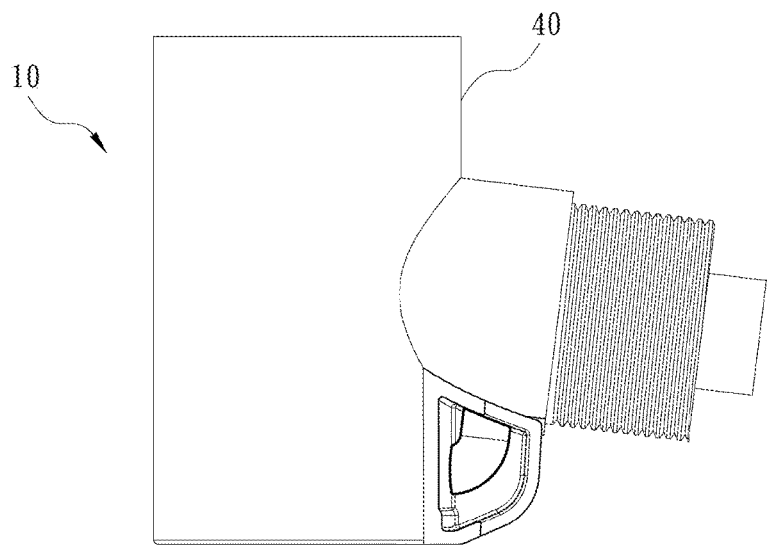
Figure 2E:
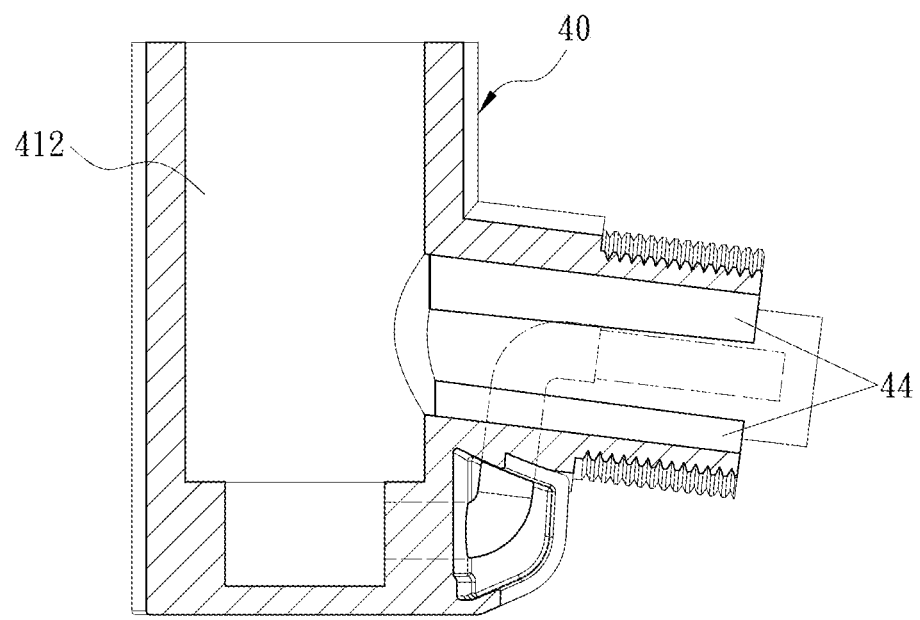
Figure 3:
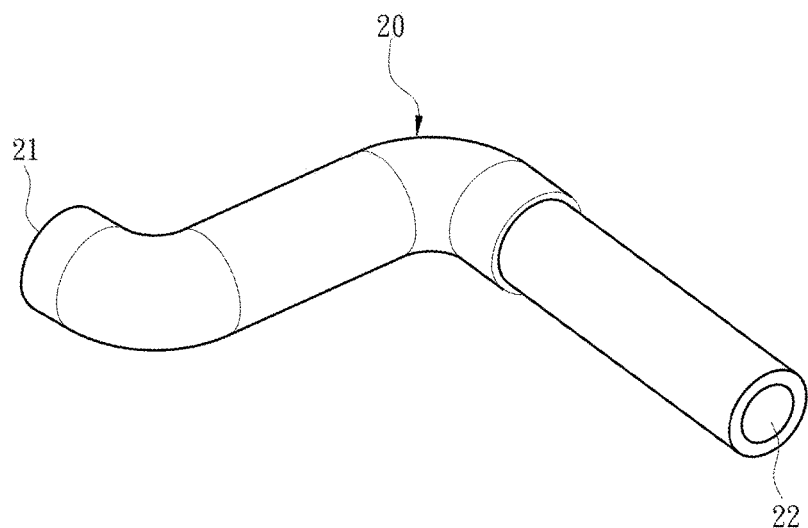
FIG. 3 is a perspective schematic diagram of a hollow tube of the present invention.
Figure 4:
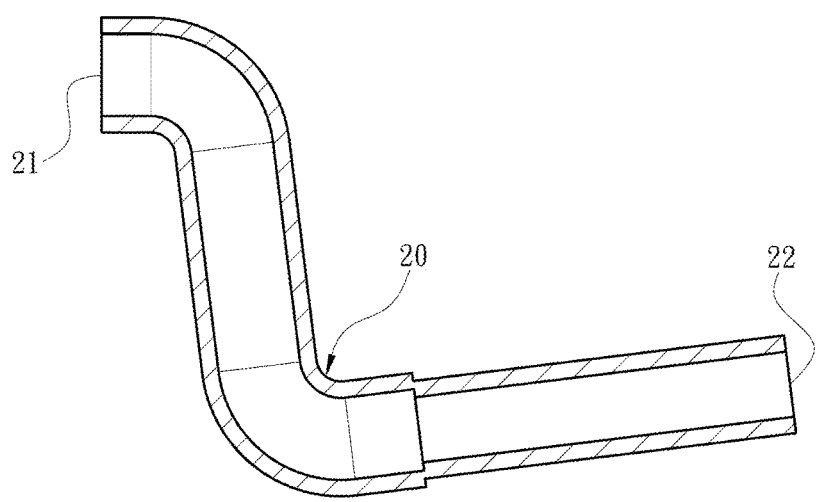
FIG. 4 is a sectional schematic diagram of a hollow tube of the present invention.

In step S001, a hollow tube 20 is provided. Referring to FIG. 3 and FIG. 4, in this embodiment, the hollow tube 20 is made of a metal material, and appears Z-shaped or S-shaped. In this embodiment, the hollow tube 20 is mainly implemented as Z-shaped, and has a first end 21 and a second end 22 that open and are mutually in communication. In practice, the hollow tube 20 may also be made of a non-metal material, which refers to a plastic material having a high melting point.

In Step S002, the first end 21 and the second end 22 of the hollow tube 20 are sealed, and the hollow tube 20 is placed into a mold 30 having a formation space 31. The mold 30 includes therein a pair of clamping portions 32 for clamping the hollow tube 20, such that the hollow tube 20 is positioned in the mold 30 by using the pair of clamping portions 32. In this embodiment, the first end 21 of the hollow tube 20 is primarily sealed by a stopper 33, the second end 22 is sealed by a thimble 34, and the pair of clamping portions 32 clamp on a tube wall 23 at an outer side of the hollow tube 20, such that the hollow tube 20 is positioned in the formation space 31 of the mold 30.

In step S003, a plastic material is injected into the formation space 31 of the mold 30 to have the plastic material fill the formation space 31 and envelop the hollow tube 20, and the plastic material is cured to have the plastic material form an overall housing 40 in the mold 30 according to the shape of the formation space 31. It should be noted that, when the hollow tube 20 is made of a non-metal material, a material having a high melting point needs to be selected to prevent the hollow tube 20 from melting while forming the overall housing 40. In other words, the melting point of the material selected for hollow tube 20 needs to be higher than the melting point of the plastic material.

Figure 5:
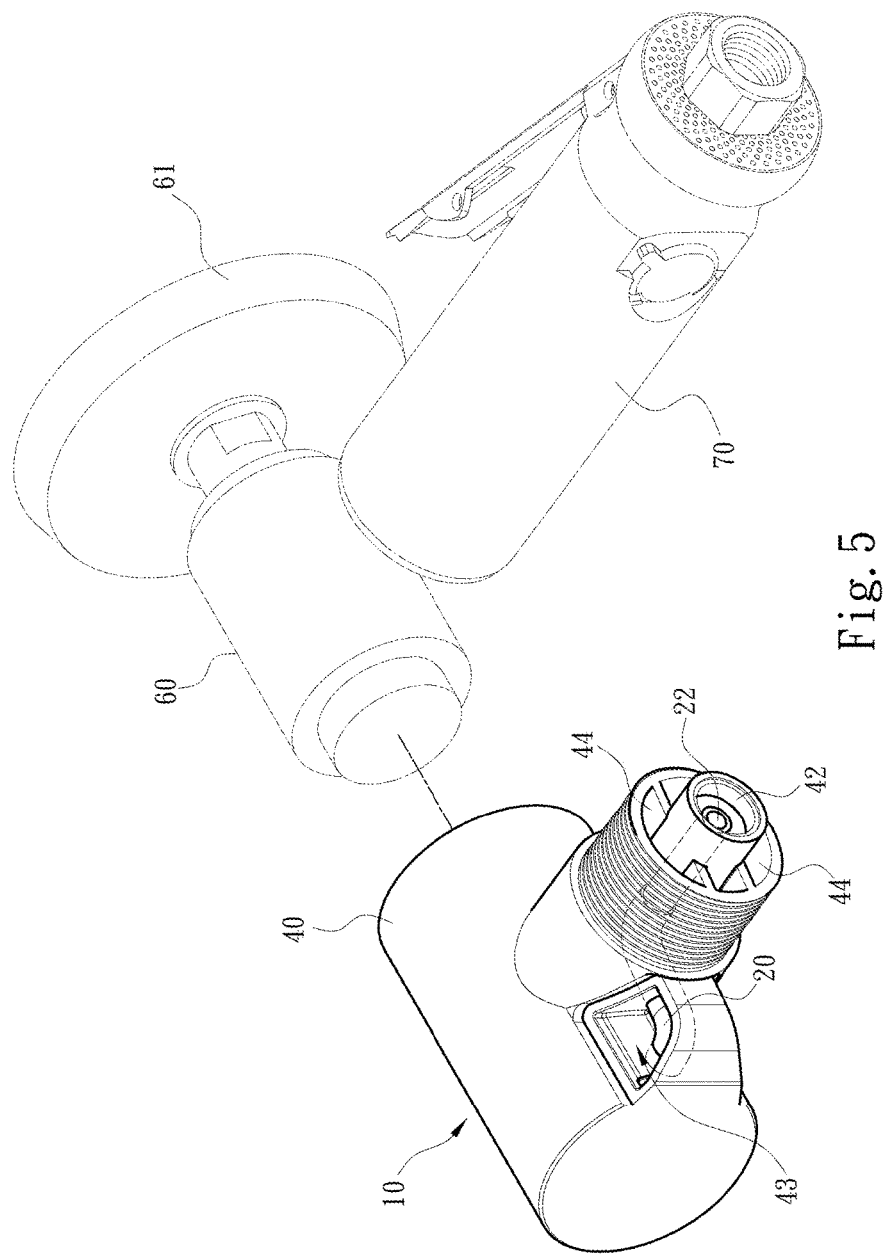
FIG. 5 is an exploded schematic diagram of an angle-type air tool housing of the present invention in use.
Figure 6:
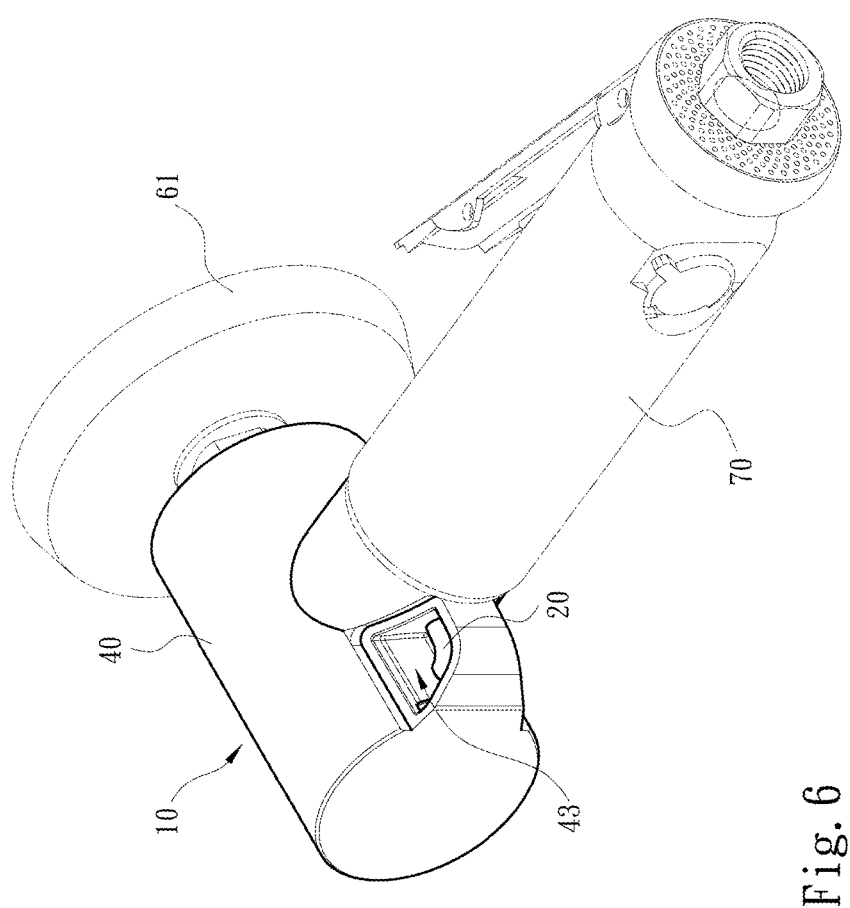
FIG. 6 is a perspective schematic diagram of an angle-type air tool housing of the present invention in use.
Figure 7:
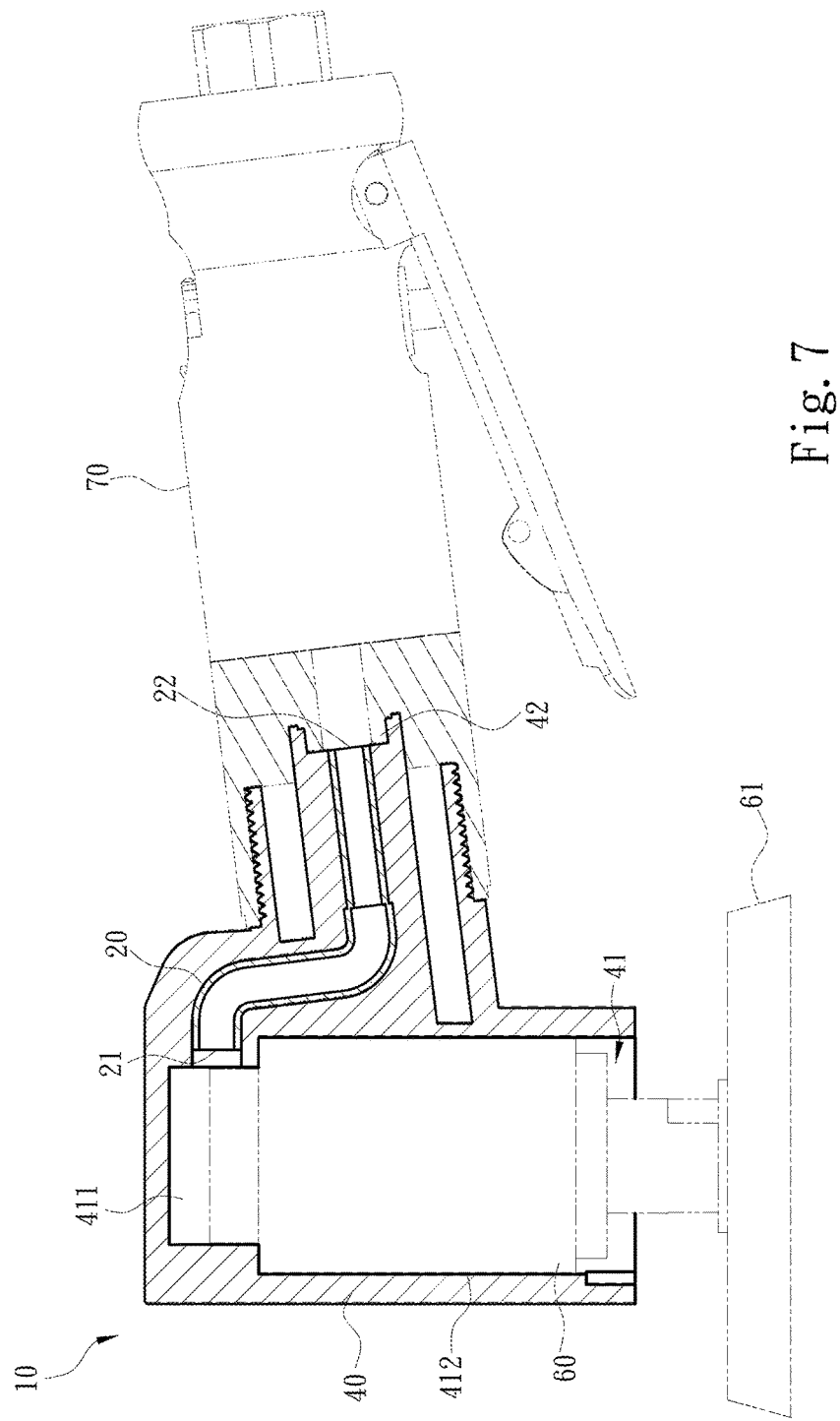
FIG. 7 is a sectional schematic diagram of an angle-type air tool housing of the present invention in use.

In step S004, the overall housing 40 is removed from the mold 30, wherein the overall housing 40 has an accommodating chamber 41 and an air channel 42 mutually spaced, the accommodating chamber 41 is adjacent to the first end 21 of the hollow tube 20, and the air channel 42 is adjacent to the second end 22 of the hollow tube 20. Next, the first end 21 and the second end 22 are unsealed. The unsealing of the first end 21 and the second end 22 refers to removing the stopper 33 and the thimble 34 from the first end 21 and the second end 22, such that the accommodating chamber 41 and the air channel 42 become mutually in communication through the hollow tube 20, and the overall housing 40 is provided with a pair of recesses 43 at positions corresponding to the pair of clamping portions 32 so as to expose the tube wall 23 of the hollow tube 20 in the pair of recesses 43, thus forming the angle-type air tool housing 10 that is a formed integral with the hollow tube 20, as shown in FIG. 5. However, in this embodiment, while forming the overall housing 40, the accommodating chamber 41 divided into a first air chamber 411 and the second air chamber 412 that are mutually in communication, and the first air chamber 411 is adjacent to and in communication with the first end 21 of the hollow tube 20. Further, in this embodiment, the overall housing 40 is further provided with at least one air discharging groove 44. In this embodiment, two air discharging grooves 44 are implemented. The two air discharging grooves 44 are mutually spaced and are provided around the air channel 42, and are individually adjacent to and mutually in communication with the second air chamber 412.

Referring to FIG. 2A, FIG. 2B, FIG. 2C, FIG. 2D, FIG. 2E, FIG. 3, FIG. 4, FIG. 5, FIG. 6 and FIG. 7, the angle-type air tool housing 10 manufactured by the above method includes a hollow tube 20 and an overall housing 40. The hollow tube 20 includes a first end 21 and a second end 22, which are mutually in communication. The overall housing 40 covers a part of the hollow tube 20, and includes an accommodating chamber 41 adjacent to the first end 21 and an air channel 42 adjacent to the second end 22. The accommodating chamber 41 and the air channel 42 are mutually in communication through the hollow tube 20. The overall housing 40 is provided with a pair of recesses 43 at positions corresponding to the pair of clamping portions 32, such that a part of the tube wall 23 of the hollow tube 20 is exposed at the pair of recesses 43. In this embodiment, being clamped by the pair of clamping portions 32, the tube wall 23 exposed at the pair of recesses 43 is formed after the overall housing 40 is formed through injection molding in the mold 30 and removed from the mold 30, accordingly allowing the hollow tube 20 to be a formed integral with the overall housing 40.

The angle-type air tool housing 10 of the present invention is primarily for setting a grinding assembly 60, and is connected to a handle 70 of a pneumatic device (which is prior art and associated details shall be omitted herein). The grinding assembly 60 is assembled at the accommodating chamber 41 and is pivotally connected with a grinding plate 61, and the grinding plate 61 is extended to an exterior of the accommodating chamber 41 to grind an object (prior art, not shown in the drawings). The handle 70 is connected to the air channel 42, such that the air channel 42 becomes in communication with the pneumatic device.

When the pneumatic device is controlled by using the handle 70 to introduce a gas, the gas is allowed to pass through the air channel 42 and the hollow tube 20 to enter the first air chamber 411 of the accommodating chamber 41, so as to use the gas to drive the grinding assembly 60 and to drive the grinding plate 61 to grind the object. After the gas passes through the first air chamber 411 to drive the grinding assembly 60, the gas again passes through the second air chamber 412 to be discharged outwards through the two air discharging grooves 44. Thus, using the flowing of the gas, the grinding assembly 60 is maintained in a driven state.

Compared to the prior art, the angle-type air tool housing 10 is formed by injecting a plastic material outside the hollow tube 20, allowing the hollow tube 20 to form an integral with the overall housing 40. Thus, the present invention can be used for mass production to enhance production efficiency. Further, the overall housing 40 of the present invention is formed by a plastic material and has a lighter weight, and is capable of reducing a burden of an operator.

What is claimed is:

1. A method for manufacturing an angle-type air tool housing, comprising:
    step (1): providing a hollow tube having a first end and a second end that are open and are mutually in communication;
    step (2): sealing the first end and the second end of the hollow tube, and placing the hollow tube into a mold having a formation space, the mold comprising therein a pair of clamping portions for clamping the hollow tube such that the hollow tube is positioned in the mold by using the pair of clamping portions;
    step (3): injecting a plastic material into the formation space of the mold to have the plastic material fill the formation space and envelop the hollow tube, and curing the plastic material to have the plastic material form an overall housing in the mold according to the shape of the formation space; and
    step (4): removing the overall housing from the mold, wherein the overall housing has an accommodating chamber and an air channel mutually spaced, the accommodating chamber is adjacent to the first end of the hollow tube, and the air channel is adjacent to the second end of the hollow tube; and unsealing the first end and the second end such that the accommodating chamber and the air channel are in communication through the hollow tube, wherein the overall housing is provided with a pair of recesses at positions corresponding to the pair of clamping portions, such that a part of the hollow tube is exposed at the pair of recesses, thus forming the angle-type air tool housing that is a formed integral with the hollow tube.

2. The method for manufacturing an angle-type air tool housing of claim 1, wherein the hollow tube is further made of one selected from a metal material and a non-metal material.

3. The method for manufacturing an angle-type air tool housing of claim 2, wherein the first end of the hollow tube is further sealed by a stopper, and the second end is further sealed by a thimble.

4. The method for manufacturing an angle-type air tool housing of claim 1, wherein the accommodating chamber further comprises a first air chamber and a second air chamber that are mutually in communication, and the first end of the hollow tube is adjacent to the first air chamber.

5. The method for manufacturing an angle-type air tool housing of claim 4, wherein the overall housing further comprises at least one air discharging groove in communication with the second air chamber, and the air discharging groove is spaced from the air channel.

* * * * *